United States Patent [19]
Roberts et al.

[11] 4,390,994
[45] Jun. 28, 1983

[54] LASER UTILIZING COATED, MULTICAPILLARY ARRAY AS OUTPUT WINDOW

[76] Inventors: James R. Roberts, 12512 W. Old Baltimore Rd., Boyds, Md. 20720; Thomas J. McIlrath, 5944 Westchester Park Dr., College Park, Md. 20740; Thomas B. Lucatorto, 3600 Van Ness St., NW., Washington, D.C. 20008

[21] Appl. No.: 168,698

[22] Filed: Jul. 14, 1980

[51] Int. Cl.³ ............................................. H01S 3/08
[52] U.S. Cl. ..................................... 372/99; 372/103; 372/108
[58] Field of Search .................... 331/94.5 C, 94.5 D; 350/319

[56] References Cited

U.S. PATENT DOCUMENTS 3,577,094 5/1971 Tomlinson et al. ............ 331/94.5 C
3,801,927 4/1974 Allen .............................. 331/94.5 P

OTHER PUBLICATIONS

P. D. Chopra et al., J. Phys. B7, 2421 (1974).
T. B. Lucatorto and T. J. McIlrath, Physics Review Letters, vol. 37, No. 7, pp. 428–431 (1976).
T. V. Vorburger et al., Rev. Sci. Instrum., vol. 47, pp. 501–504 (1976).

*Primary Examiner*—William L. Sikes
*Assistant Examiner*—Léon Scott, Jr.
*Attorney, Agent, or Firm*—Gerald J. Ferguson, Jr.; Joseph J. Baker

[57] ABSTRACT

Laser utilizing multicapillary array output window.

5 Claims, 1 Drawing Figure

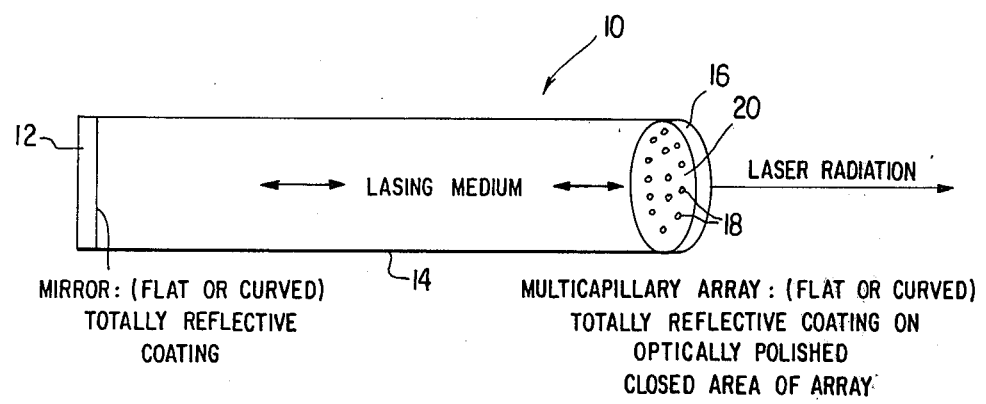

LASER UTILIZING COATED, MULTICAPILLARY ARRAY AS OUTPUT WINDOW

CROSS REFERENCE TO RELATED APPLICATION

This application is related to an application entitled "Improved Optical Devices Utilizing Multicapillary Arrays" filed on even date herewith by the applicants named in the present application, the foregoing application being incorporated herein by reference.

BACKGROUND OF THE INVENTION

1. Field of the Invention

This application is directed to lasers and to output windows for use therewith.

2. Discussion of the Prior Art

Multicapillary arrays (MCA's) made of perforated stainless steel plates have been previously reported (see P. D. Chopra, et al., J. Phys. B7, 2421 (1974)) as useful in transmitting radiation at 1216 Å although no details of the properties of the arrays were given. In recent years the technology of producing glass MCA's having capillaries of very small diameters, tightly packed in arrays giving large spatial apertures, has been developed in connection with the development of multichannel plate image intensifiers. These arrays are now commercially available from Galileo Electro-Optics Corp., Sturbridge, Mass. Most of these arrays have open areas in excess of 50%, are available with pore sizes between 1.5 $\mu$m and 100 $\mu$m, and can be fabricated in sizes in excess of 10 cm$^2$. These windows have been used to separate a vacuum spark (BRV-type) VUV (vacuum ultraviolet) source and an evacuated, grazing incidence, optical system from a ~10$^3$ $\mu$bar vapor cell to obtain atomic absorption spectra in the 100-400 Å spectral region, see T. B. Lucatorto and T. J. McIlrath, Physics Review Letters, Vol. 37, No. 7, pp. 428-431 (1976). They were also used as an output window on a gas discharge VUV light source in the 400-1050 Å spectral region, see T. V. Vorburger, et al., Rev. Sci. Instrum., Vol. 47, p. 501 (1976). In these foregoing experiments the flat glass surface which alternates with the clear aperture of the array was not used for any purpose. MCA applications including the application of the present invention are also discussed in an article by the present inventors, see Applied Optics, Vol. 18, page 2505, July 15, 1979. All of the foregoing articles are incorporated herein by reference.

OBJECTS OF THE INVENTION

A primary object of the present invention is to provide an improved laser having an MCA as an output window.

Other objects and advantages of this invention will be apparent from a reading of the following specification and claims taken with the drawing.

BRIEF DESCRIPTION OF THE DRAWING

The sole FIGURE of the drawing is a diagrammatic illustration of an illustrative embodiment of a laser in accordance with the invention.

DETAILED DESCRIPTION OF PREFERRED EMBODIMENTS OF THE INVENTION

Referring to the sole FIGURE of the drawing, there is shown a laser 10 including a resonant cavity containing an active, lasing medium and comprising a flat or curved mirror 12 having a totally reflective coating, a containing wall 14 and a curved or flat output window 16. As is known to those of ordinary skill in the lasing art, a pumping means for creating an electronic population inversion in the lasing medium is always provided. This can be a chemical reaction in a chemical laser, a high energy gas flow in a gas dynamic laser, or electrical/optical pumping in the conventional laser. In accordance with the invention, window 16 includes an MCA having a plurality of pores or apertures 18 which alternate with the closed area 20 of the array. Coated upon closed area 20 is a reflective coating which is normal to the laser radiation thereby allowing gain in the excited medium. The MCA together with the coating comprises the output window 16 which acts as a partially transmitting mirror where part of the radiation is reflected by the coating and the remaining part is transmitted through the pores. By varying the ratio of the open area of the array (that is, the cross-sectional area of the pores 18) with respect to the closed area, the output coupling can be varied without changing the nature of the reflective coating.

The foregoing reflective coating may typically be a multi-layer dielectric coating. Before depositing the coating, the closed area 20 may be optically ground and polished on either one or both of the flat (or curved) surfaces of the MCA. Layers of Al and MgF$_2$ may be alternately vacuum deposited to thus form the desired multilayer dielectric coating. The vacuum deposition of the layers will not cover over the pores 18. Reference should be made to an article entitled "Special Application Coatings for the Vacuum Ultraviolet" by Bruce K. Flint, Paper No. 140-14, given at the SPIE Symposium, Mar. 29, 1978, which is available from Acton Research Corporation, Acton, Mass. 01720, for a description of VUV, multilayer dielectric coatings which may be used in the present invention in the VUV range (approximately 20-2000 A). The provision of such reflective coatings for longer wavelength ranges is also well known.

Output window 16 is particularly advantageous in the VUV range since in this range and, in particular, at wavelengths less than 1050 Å, there are only a few metallic thin film coatings which may be used in certain portions of the range and even these are subject to contamination, corrosion and even destruction if used in a moderately intense laser radiation environment. The output window of the present invention is rugged, has a broad spectral band pass and provides a large aperture window. Further, it may be used in the VUV range since the radiation is transmitted through the pores 18 and not through the material itself.

Further, the output window of the present invention is particularly well suited for use with high power lasers regardless of the wavelength although it is to be understood that the window may be used with lasers operating at any wavelength regardless of the output power thereof. Most solid materials are subject to damage when the power density of the incident energy thereon is equal to or greater than 300×10$^6$ watts/cm$^2$. However, again due to the transmission of the incident energy through the pores 18, the output window of this invention is well suited for transmitting energy, the power density of which exceeds the foregoing figure.

Typically, although not necessarily, a vacuum interface is provided whereby a substantial pressure differential may or may not exist across output window 16. If such a pressure differential is maintained, the ratio of the diameter of the pores, D, to the length thereof, L, should be small enough that the flow through the pores may be characterized as molecular flow. If it is not necessary to maintain a substantial pressure differential, D/L should nevertheless be small enough to contain the lasing medium within the laser. Further, if it is necessary to retain image or beam quality, the diameter of the pores should be at least $50\lambda$ where $\lambda$ is the wavelength of the laser output radiation and preferably it should be at least $100\lambda$ whether or not a substantial pressure differential exists across the window. If only simple light transmission is required, the pore diameter should at least be greater than $\lambda$. Further, if it is necessary to maintain coherence in the reflected and transmitted radiation, the separation of the pores should be less than the coherence dimension of the radiation.

It is to be understood that the above detailed description of the various embodiments of the invention is provided by way of example only. Various details of design and construction may be modified without departing from the true spirit and scope of the invention as set forth in the appended claims.

What is claimed is:

1. In a laser for generating output radiation having a wavelength of less than 2000 A, including an active, lasing medium, pumping means for creating a population inversion in said medium, and an optical resonant cavity including a totally reflective mirror disposed at one end of the resonant cavity and an output window disposed at the other end of the resonant cavity, the improvement comprising said output window including a multi-capillary array having a plate with a plurality of pores extending therethrough parallel to the said output radiation from the laser, said pores having a diameter, a length, and a diameter-to-length ratio comprising a means for establishing molecular flow of said lasing medium therethrough, said pores comprise an open area of the plate and the remaining area of said plate in contact with the lasing medium and surrounding said pores comprises a closed area, said closed area being normal to the laser radiation and provided with a coating which reflects the laser radiation.

2. In a laser as in claim 1 wherein the wavelength of said output radiation is less than 1050 Å.

3. In a laser as in claim 1 wherein the power density of said output radiation is at least approximately $300 \times 10^6$ watts/cm$^2$.

4. In a laser as in claim 1 where the diameter of the pores is at least $50\lambda$ where $\lambda$ is the wavelength of the output radiation.

5. In a laser as in claim 6 where said pore diameter is at least $100\lambda$.

* * * * *